(No Model.)

R. A. DEAN.
CORN PLANTER ATTACHMENT.

No. 392,911. Patented Nov. 13, 1888.

Witnesses:
Edm. P. Ellis,
L. L. Burket.

Inventor:
R. A. Dean,
per F. A. Lehmann,
Atty.

United States Patent Office.

ROBERT A. DEAN, OF TYLER, TEXAS.

CORN-PLANTER ATTACHMENT.

SPECIFICATION forming part of Letters Patent No. 392,911, dated November 13, 1888.

Application filed July 31, 1888. Serial No. 281,546. (No model.)

*To all whom it may concern:*

Be it known that I, ROBERT A. DEAN, of Tyler, in the county of Smith and State of Texas, have invented certain new and useful Improvements in Corn-Planting Attachments; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planting attachments; and it consists in the combination of a suitable hopper which is to be attached to the side of the beam, a spring-actuated seed-slide, an extension or support which projects from one end of the hopper, a pivoted lever placed upon the extension and connected to the seed-slide at one end, a strap connected to the outer end of the lever, and the singletree to which the draft-animal is secured, as will be more fully described hereinafter.

The object of my invention is to convert any ordinary plow or cultivator into a corn-planter by means of a hopper which is secured directly to the beam, and which is operated by the pivoted motion of the singletree as the draft-animal moves forward.

Figure 1:
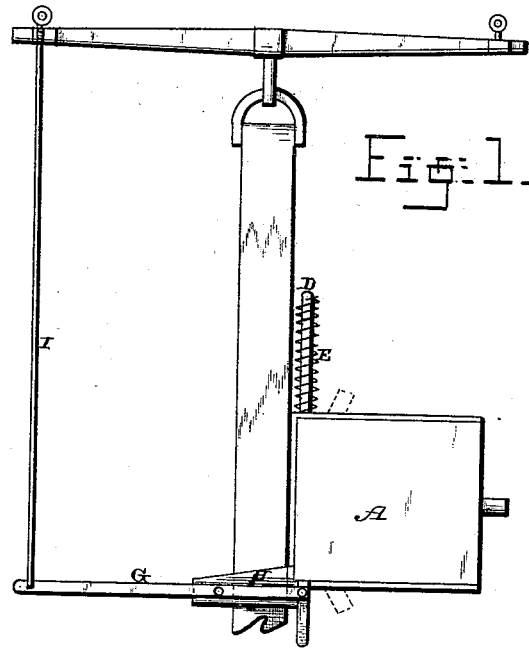
Figure 2:
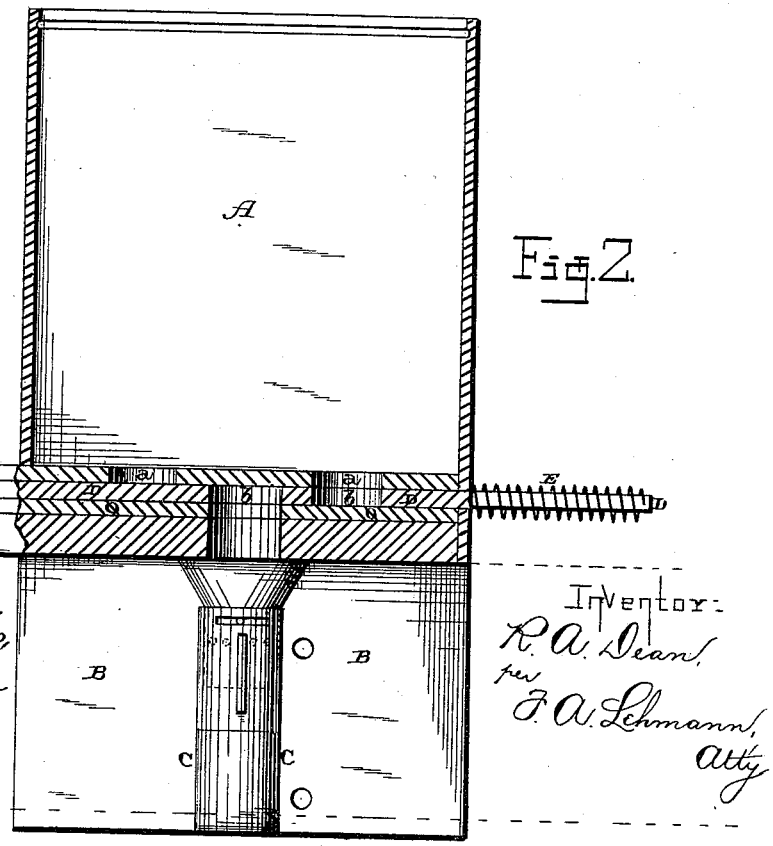

Figure 1 is a plan view of a corn-planter which embodies my invention. Fig. 2 is a side elevation, partly in section.

A represents the hopper, the rear board or side of which extends downward any suitable distance, so as to form an extension, B, which is secured directly to the side of the beam of the plow or cultivator. The hopper is made triangular in shape; but I do not restrict myself to any particular construction in this respect. From the bottom of the hopper extends the metallic tube C, which is provided with a slot at its upper end, so that the tube may be made to extend in any desired direction, and thus drop the seed in any desired relation to the side of the beam. If the furrow is a very narrow one, then the lower end of the tube can be turned either forward or back and brought close to the side of the beam; or, if the furrow is a wide one, the end of the tube can be made to extend outward, and thus deposit the seed some distance from the side of the beam. The seed-slide D extends through the bottom of the hopper and extends beyond it at each end. At the forward end the slide projects far enough to receive the spring E, which returns the slide to position as soon as it is free to move. To the opposite end of the seed-slide is secured the inner end of the operating-lever G, which is pivoted upon the extension H, which projects horizontally from the bottom of the hopper and across the top of the beam. To the outer end of this lever is secured a strap, I, the front end of which is provided with a snap-hook or other attachment, by means of which this end can be attached directly to the single-tree. As the draft-animal moves forward, the singletree has first one end advanced by the motion of the draft-animal and then the other, and this motion is sufficiently great to operate the pivoted lever and, through the lever, the seed-slide.

Through the bottom of the hopper are made two holes, *a*, for dropping the seed, and through the seed-slide are also made two holes, *b*. In order to regulate the amount of seed that is to be dropped, there is placed under the seed-slide a separate and distinct slide, O, which has but a single opening through it, and which normally registers with the hole through the bottom piece of the hopper. When it is desired to stop the planting entirely, it is only necessary to move this slide O endwise, so that the hole through it will no longer register with the hole through the bottom piece of the hopper, and then the dropping of the seed is stopped entirely. In order to hold this slide in any desired position, there are two recesses, R Q, cut in its outer end, and in one of which the outer end of the spring S is made to catch, according as it is desired to plant or shut off the flow of seed. When the end of the spring is made to catch in the outer one of the two recesses, the hole through the slide registers with the hole through the bottom of the hopper; but when the slide is moved endwise, so that the end of the spring catches in the inner recess, the inner end of the slide is made to close the opening, and the flow of seed is shut off entirely. When the slide is forced inward, two hills of grain are planted to each step of the horse. If it is desired to plant only one hill, then a plug can be placed in one of the holes in the bottom of the hopper, and thus one hill will be planted at every step. Either peas, corn, or beans can be planted, or any two of them together, as may be desired.

I am aware that dropping attachments have heretofore been operated by the movement of the singletree, but not in the manner or by means of the devices here shown. Where others have heretofore used both ends of the singletree to operate the dropper, I attach to one end of the singletree only, and use a spring to return the parts to position.

Having thus described my invention, I claim—

1. The combination of the hopper which is to be secured to the side of the beam, the extension which projects horizontally therefrom, the lever pivoted upon this extension, the spring-actuated seed-slide connected to the inner end of the lever, the strap, and the singletree, substantially as shown.

2. The combination of the hopper, the spring-actuated seed-slide, and a separate slide, O, provided with notches in its under side, a spring for holding the slide in position, a pivoted lever connected to the seed-slide at one end, and a strap for connecting the end of the lever to the singletree, substantially as set forth.

3. The combination of the beam, the hopper secured thereto, the seed-slide which projects beyond the hopper at both of its ends, a spring applied to one end of this slide for returning it to position, a pivoted lever connected to the opposite end of the slide from the spring, the singletree, and a connection between one end of the lever and the singletree, whereby the slide is operated by the movement of one end of the singletree alone, substantially as set forth.

In testimony whereof I affix my signature in presence of two witnesses.

ROBT. A. DEAN.

Witnesses:
F. P. HENDERSON,
BEN M. HAGEY.